(12) United States Patent
Neet

(10) Patent No.: US 6,882,077 B2
(45) Date of Patent: Apr. 19, 2005

(54) STATOR WINDING HAVING CASCADED END LOOPS

(75) Inventor: Kirk E. Neet, Saline, MI (US)

(73) Assignee: Visteon Global Technologies, Inc., Van Buren Township, MI (US)

(*) Notice: Subject to any disclaimer, the term of this patent is extended or adjusted under 35 U.S.C. 154(b) by 8 days.

(21) Appl. No.: 10/443,441

(22) Filed: May 22, 2003

(65) Prior Publication Data

US 2004/0119362 A1 Jun. 24, 2004

Related U.S. Application Data

(63) Continuation-in-part of application No. 10/324,319, filed on Dec. 19, 2002.
(60) Provisional application No. 60/454,996, filed on Mar. 14, 2003.

(51) Int. Cl.$^7$ ............................................. H02K 17/00
(52) U.S. Cl. ...................................... 310/208; 310/201
(58) Field of Search .................................. 310/201–208

(56) References Cited

U.S. PATENT DOCUMENTS

| | | | |
|---|---|---|---|
| 693,579 A | 2/1902 | Wait | 310/201 |
| 3,270,229 A | 8/1966 | Ruelle et al. | 310/180 |
| 3,634,708 A | 1/1972 | Fisher | 310/195 |
| 4,331,896 A | 5/1982 | Sedgewick | 29/596 |
| 4,337,567 A | 7/1982 | Lugosi et al. | 29/598 |
| 4,399,843 A | 8/1983 | Sedgewick | 160/92 |
| 4,405,553 A | 9/1983 | Lovgren et al. | 264/272.19 |
| 4,451,749 A | 5/1984 | Kanayama et al. | 310/62 |
| 4,556,811 A | 12/1985 | Hendricks | 310/266 |
| 4,587,824 A | 5/1986 | Wiersema et al. | 72/257 |
| 4,617,725 A | 10/1986 | Holter et al. | 310/598 |
| 4,663,551 A | 5/1987 | Weh et al. | 310/152 |
| 4,928,042 A | 5/1990 | Harms et al. | 310/254 |
| 5,097,167 A | 3/1992 | Kanayama et al. | 310/201 |
| 5,115,556 A | 5/1992 | Gavrilidis et al. | 29/596 |
| 5,329,197 A | 7/1994 | Kudlacik | 310/198 |
| 5,331,244 A | 7/1994 | Rabe | 310/180 |
| 5,343,105 A | 8/1994 | Sakabe et al. | 310/179 |
| 5,394,321 A | 2/1995 | McCleer et al. | 310/131 |
| 5,444,321 A | 8/1995 | Honda et al. | 310/263 |
| 5,449,962 A | 9/1995 | Shichijyo et al. | 310/186 |
| 5,519,266 A | 5/1996 | Chitayat | 310/12 |
| 5,539,265 A | 7/1996 | Harris et al. | 310/263 |
| 5,616,977 A | 4/1997 | Hill | 310/179 |
| 5,619,088 A | 4/1997 | Yumiyama et al. | 310/270 |
| 5,642,009 A | 6/1997 | McCleer et al. | 310/156.35 |
| 5,722,153 A | 3/1998 | Holmes et al. | 29/598 |
| 5,744,896 A | 4/1998 | Kessinger, Jr. et al. | 310/268 |
| 5,787,567 A | 8/1998 | Miyazaki | 29/596 |
| 5,926,940 A | 7/1999 | Toh et al. | 29/596 |
| 5,936,326 A | 8/1999 | Umeda et al. | 310/179 |
| 5,955,804 A | 9/1999 | Kusase et al. | 310/59 |

(Continued)

FOREIGN PATENT DOCUMENTS

| | | |
|---|---|---|
| EP | 0751609 A2 | 2/1997 |
| EP | 1211781 A1 | 5/2002 |
| WO | WO 99/34499 | 8/1999 |

OTHER PUBLICATIONS

U.S. Appl. No. filed 10/723,527, Nov. 26, 2003.

*Primary Examiner*—Dang Le
(74) *Attorney, Agent, or Firm*—MacMillan Sobanski & Todd LLC

(57) ABSTRACT

An alternator stator having cascaded end loop segments includes a multi-phase stator winding that is adapted to be placed in a plurality of circumferentially spaced axially-extending core slots in a surface of a stator core. The stator winding includes a plurality of straight segments alternately connected at the first and second ends of the stator core by a plurality of end loop segments to form the winding. The end loop segments include first and second sloped portions meeting at an apex portion. Each of the end loop segments includes a radial outward adjustment and a radial inward adjustment and forms a cascaded winding pattern.

23 Claims, 8 Drawing Sheets

U.S. PATENT DOCUMENTS

| | | | |
|---|---|---|---|
| 5,955,810 A | 9/1999 | Umeda et al. | 310/208 |
| 5,962,943 A | 10/1999 | Shervington | 310/156.37 |
| 5,965,965 A | 10/1999 | Umeda et al. | 310/52 |
| 5,986,375 A | 11/1999 | Umeda et al. | 310/180 |
| 5,994,802 A | 11/1999 | Shichijyo et al. | 310/51 |
| 5,998,903 A | 12/1999 | Umeda et al. | 310/179 |
| 6,011,332 A | 1/2000 | Umeda et al. | 310/58 |
| 6,037,695 A | 3/2000 | Kanazawa et al. | 310/263 |
| 6,051,906 A | 4/2000 | Umeda et al. | 310/179 |
| 6,059,969 A | 5/2000 | Mizutani | 310/263 |
| 6,069,424 A | 5/2000 | Colello et al. | 310/58 |
| 6,078,116 A | 6/2000 | Shiga et al. | 310/60 R |
| 6,091,169 A | 7/2000 | Umeda et al. | 310/62 |
| 6,097,130 A | 8/2000 | Umeda et al. | 310/263 |
| 6,124,660 A | 9/2000 | Umeda et al. | 310/215 |
| 6,137,201 A | 10/2000 | Umeda et al. | 310/179 |
| 6,137,202 A | 10/2000 | Holmes et al. | 310/180 |
| 6,147,430 A | 11/2000 | Kusase et al. | 310/215 |
| 6,147,432 A | 11/2000 | Kusase et al. | 310/260 |
| 6,166,461 A | 12/2000 | Kusase et al. | 310/58 |
| 6,177,747 B1 | 1/2001 | Maeda et al. | 310/179 |
| 6,181,043 B1 | 1/2001 | Kusase et al. | 310/201 |
| 6,181,045 B1 | 1/2001 | Umeda et al. | 310/201 |
| 6,201,332 B1 | 3/2001 | Umeda et al. | 310/184 |
| 6,204,586 B1 | 3/2001 | Umeda et al. | 310/179 |
| 6,208,060 B1 | 3/2001 | Kusase et al. | 310/254 |
| 6,211,594 B1 | 4/2001 | Umeda et al. | 310/180 |
| 6,222,295 B1 | 4/2001 | Umeda et al. | 310/179 |
| 6,242,836 B1 | 6/2001 | Ishida et al. | 310/215 |
| 6,252,326 B1 | 6/2001 | Umeda et al. | 310/179 |
| 6,268,678 B1 | 7/2001 | Asao et al. | 310/201 |
| 6,281,614 B1 | 8/2001 | Hill | 310/207 |
| 6,285,105 B1 | 9/2001 | Asao et al. | 310/208 |
| 6,291,918 B1 | 9/2001 | Umeda et al. | 310/215 |
| 6,333,573 B1 | 12/2001 | Nakamura | 310/45 |
| 6,335,583 B1 | 1/2002 | Kusase et al. | 310/254 |
| 6,337,530 B1 | 1/2002 | Nakamura et al. | 310/258 |
| 6,348,751 B1 | 2/2002 | Jermakian et al. | 310/207 |
| 6,373,164 B1 | 4/2002 | Nishimura | 310/207 |
| 6,515,393 B1 | 2/2003 | Asao et al. | 310/284 |
| 6,552,463 B1 | 4/2003 | Oohashi et al. | 310/207 |
| 6,750,582 B1 * | 6/2004 | Neet | 310/208 |
| 2001/0011852 A1 | 8/2001 | Nakamura et al. | 310/215 |
| 2002/0079771 A1 | 6/2002 | Taji et al. | 310/201 |
| 2002/0117928 A1 | 8/2002 | Yasuhara et al. | 310/201 |

\* cited by examiner

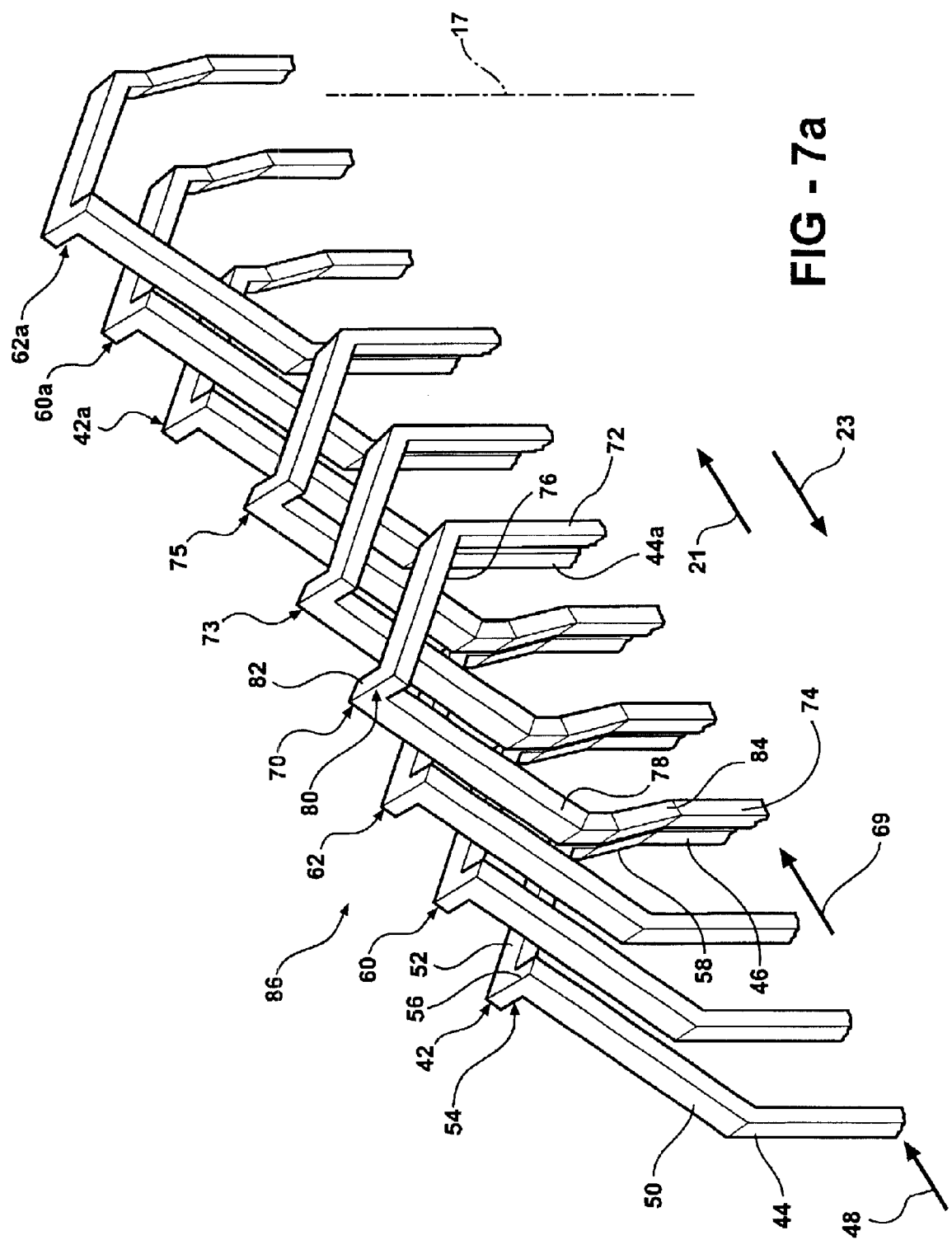

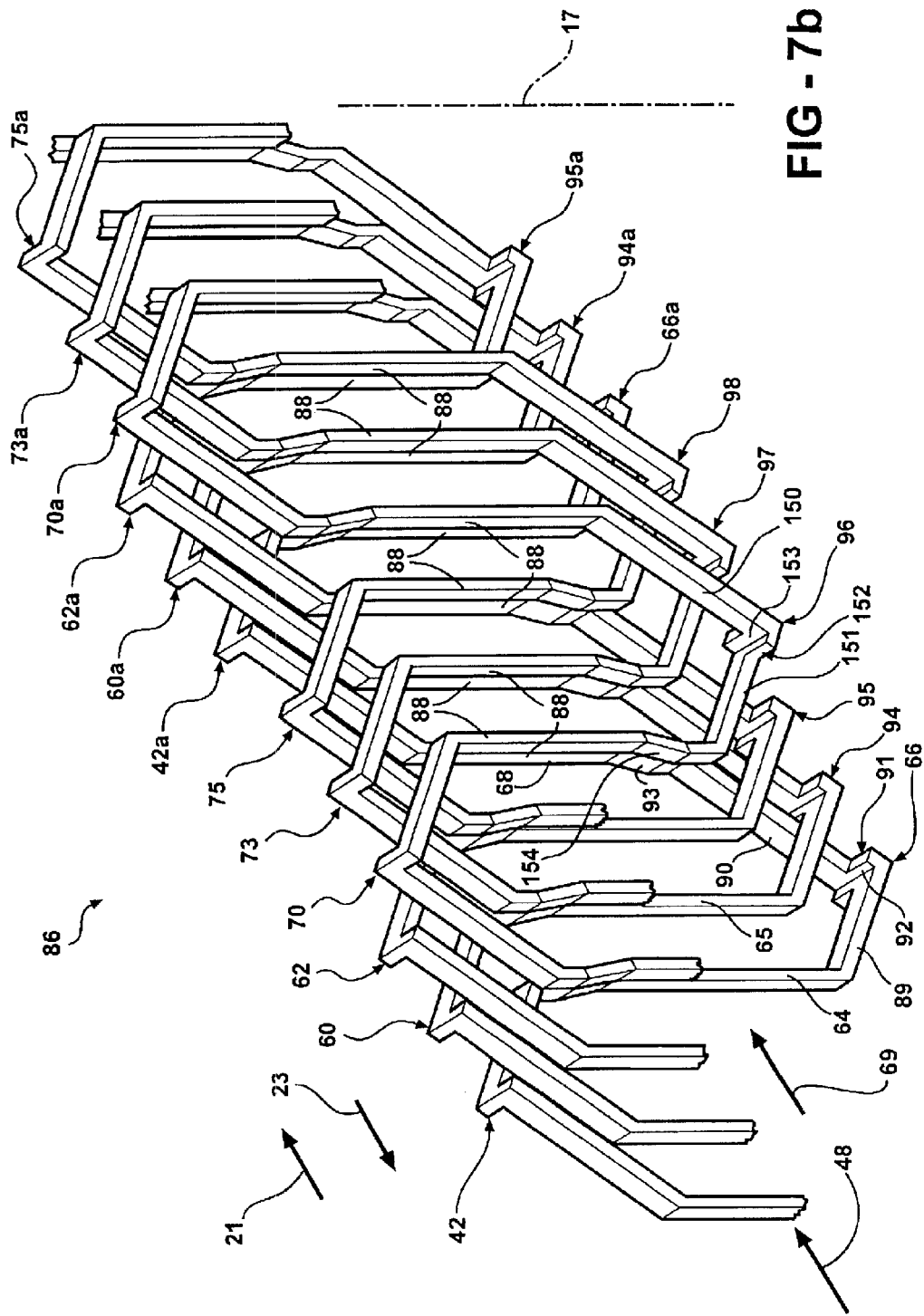

STATOR WINDING HAVING CASCADED END LOOPS

CROSS-REFERENCE TO RELATED APPLICATION

This application is a continuation-in-part of co-pending U.S. patent application Ser. No. 10/324,319 filed Dec. 19, 2002.

This application claims the benefit of U.S. provisional patent application Ser. No. 60/454,996 filed Mar. 14, 2003.

BACKGROUND OF THE INVENTION

The present invention relates generally to dynamoelectric machines and, in particular, to a stator winding for a dynamoelectric machines having cascaded end loops.

Dynamoelectric machines, such as alternating current electric generators, or alternators are well known. Prior art alternators typically include a stator assembly and a rotor assembly disposed in an alternator housing. The stator assembly is mounted to the housing and includes a generally cylindrically-shaped stator core having a plurality of slots formed therein. The rotor assembly includes a motor rotor attached to a generally cylindrical shaft that is rotatably mounted in the housing and is coaxial with the stator assembly. The stator assembly includes a plurality of wires wound thereon, forming windings. The stator windings are formed of straight portions that are located in the slots and end loop sections that connect two adjacent straight portions of each phase and are formed in a predetermined multi-phase (e.g. three or six) winding pattern in the slots of the stator core. The rotor assembly can be any type of rotor assembly, such as a "claw-pole" rotor assembly, which typically includes opposed poles as part of claw fingers that are positioned around an electrically charged rotor coil. The rotor coil produces a magnetic field in the claw fingers. As a prime mover, such as a steam turbine, a gas turbine, or a drive belt from an automotive internal combustion engine, rotates the rotor assembly, the magnetic field of the rotor assembly passes through the stator windings, inducing an alternating electrical current in the stator windings in a well known manner. The alternating electrical current is then routed from the alternator to a distribution system for consumption by electrical devices or, in the case of an automotive alternator, to a rectifier and then to a charging system for an automobile battery.

A type of alternator well known in the art is a high slot fill stator, which is characterized by rectangular shaped conductors that are aligned in one radial row in each slot and that fit closely to the width of the rectangular shaped core slots. High slot fill stators are advantageous because they are efficient and help produce more electrical power per winding than other types of prior art stators. These stators, however, are disadvantageous because the windings are typically interlaced, in which the wires are required to alternate outer and inner radial portions of each slot. These interlaced windings require an interlacing process to interlace the conductors of all the phases prior to inserting the winding into the core and therefore disadvantageously increase the complexity of placing the winding the stator. Other prior art stators have utilized hairpin conductors, in which U-shaped conductors are placed in the core slots from an upper or lower axial end of the stator core. While the hairpin conductors are advantageously not interlaced, the difficulty of manufacturing the stators is still increased because the opposing ends of the U-shaped conductors must be welded to form the stator winding.

It is desirable, therefore, to provide a stator that meets the requirements of a high slot fill stator but does not require the complex interlaced winding process or the hairpin conductors of the prior art.

SUMMARY OF THE INVENTION

A stator for a dynamoelectric machine according to the present invention includes a generally cylindrically-shaped stator core having a plurality of circumferentially spaced and axially-extending core slots in a surface thereof. The core slots extend between a first and a second end of the stator core. The stator also includes a multi-phase stator winding including at least one layer of conductors. Each of the phases includes a plurality of substantially straight segments or portions disposed in the core slots that are alternately connected at the first and second ends of the stator core by a plurality of end loops or end loop segments. Each of the end loop segments includes a first sloped portion substantially co-radial with the at least one layer and a second sloped portion substantially non-co-radial with the at least one layer, defined in more detail below. The term co-radial, as utilized herein, is defined as two objects being at the same radial distance from an axis, such as the central axis of the stator core, and in the same cylindrical surface. The first and second sloped portions of the end loop segment are connected by an apex portion thereof. Each of the end loop segments includes a radial outward adjustment and a radial inward adjustment to form a nested or cascaded winding pattern.

Preferably, the stator core for the alternator stator in accordance with the present invention includes a plurality of axially extending slots formed therein that have an angled surface formed into the back of the slots. The angled surfaces are located on consecutive slots on one axial end of the core equal to the number of phases of the alternator stator winding, after which the angles are located in slots on the opposite axial end of the core and then for the next consecutive slots equal to the number of alternator phases. This pattern repeats through the circumference of the stator core. Alternatively, the stator core is a standard core with straight axial slots extending from the first axial end of the core to the second axial end of the core. The first layer and second layer of each of the phases are alternatively formed from one single continuous conductor, creating a reversing end loop for each of the phases.

A method for manufacturing the stator winding according to the present invention can be practiced by providing the generally rectangular conductors for the stator winding; forming each of the phases of the stator winding to shape; providing the stator core; and inserting each of the phases in a corresponding plurality of the core slots of the stator core.

The cascaded winding pattern in accordance with the present invention advantageously does not require the complex interlaced winding process or the hairpin conductors of the prior art. The stator winding is not interlaced because each of the straight segments of each layer are located at the same radial distance from the central axis of the stator core and, therefore, do not alternate rearward and forward positions in the slot with other conductors. In addition, the stator winding is not interlaced because the end loops or end loop segments are formed such that the conductors are radially aligned for each layer, i.e. the first conductor always lays radially outward of the second conductor, which always lays radially outward of the third conductor and so forth. Each of the end loop segments advantageously form a cascaded winding pattern.

DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 7a is a perspective view of a plurality of layers of end loop segments of a stator winding in accordance with the present invention including the layer of FIG. 2;

FIG. 7b is a perspective view of a plurality of layers of end loop segments of a stator winding shown in FIG. 7a with a plurality of straight segments and end loop segments in accordance with the present invention;

DESCRIPTION OF THE PREFERRED EMBODIMENT

Figure 1:
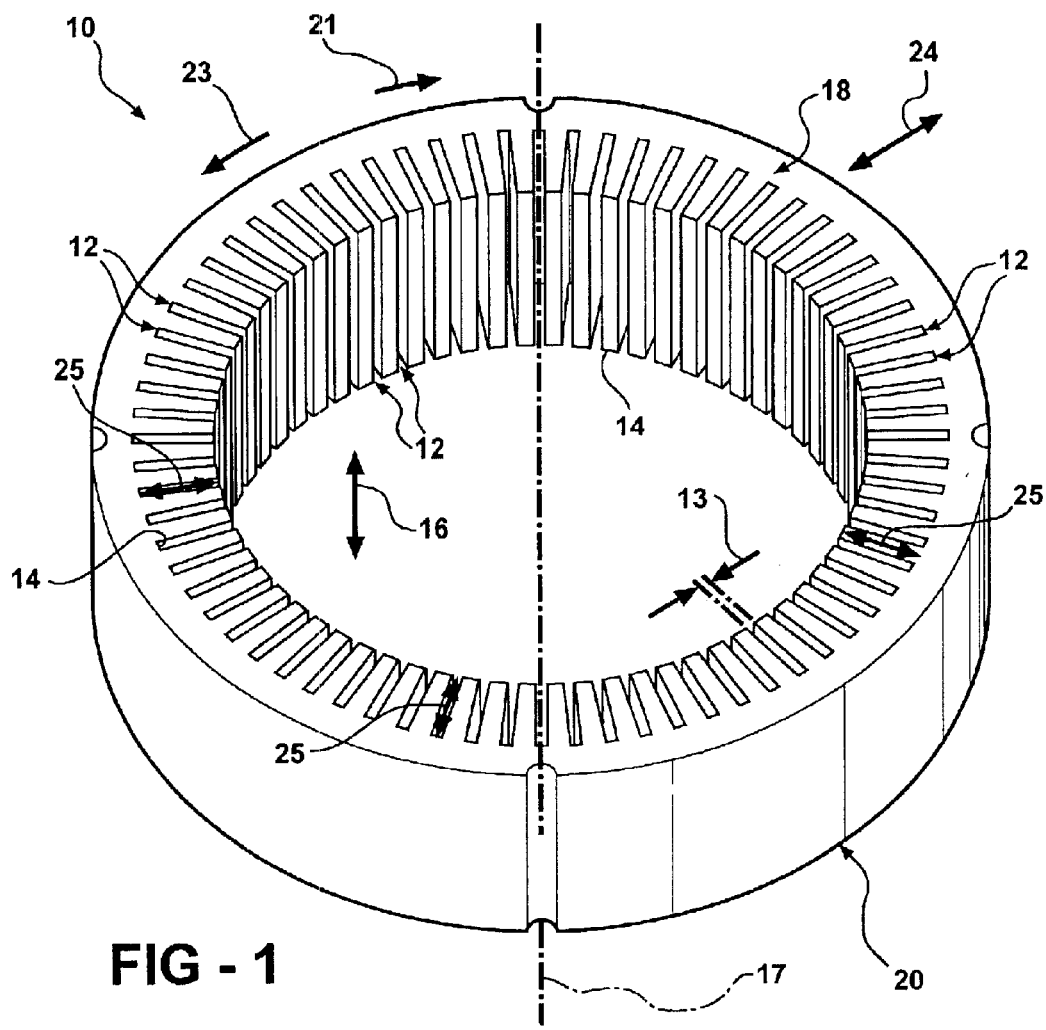
FIG. 1 is a perspective view of a stator core in accordance with the present invention.

Referring now to FIG. 1, a generally cylindrically-shaped stator core is indicated generally at 10. The stator core 10 includes a plurality of core slots 12 formed in a circumferential interior surface 14 thereof. The core slots 12 extend in a direction, indicated by an arrow 16, parallel to the central axis 17 of the stator core 10 between a first end 18 and a second end 20 thereof. An axially upward direction is defined as moving toward the first end 18 of the stator core 10 and an axially downward direction is defined as moving toward the second end 20 of the stator core 10. Preferably, the core slots 12 are equally spaced around the circumferential inner surface 14 of the stator core 10 and the respective inner surfaces 14 of the core slots 12 are substantially parallel to the central axis 17. A circumferential clockwise direction is indicated by an arrow 21 and a circumferential counterclockwise direction is indicated by an arrow 23. The core slots 12 define a depth 25 along a radial axis, indicated by an arrow 24, and are adapted to receive a stator winding, discussed in more detail below. A radial inward direction is defined as moving towards the central axis 17 of the stator core 10 and a radial outward direction is defined as moving away from the central axis 17.

Figure 2:
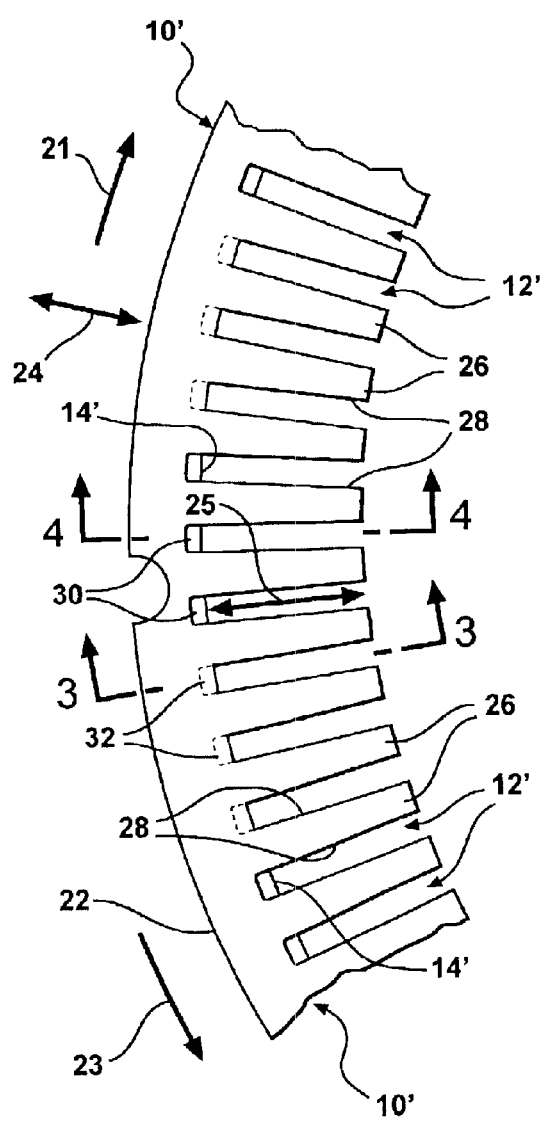
FIG. 2 is a fragmentary top/plan view of a stator core in accordance with the present invention.
Figure 3:
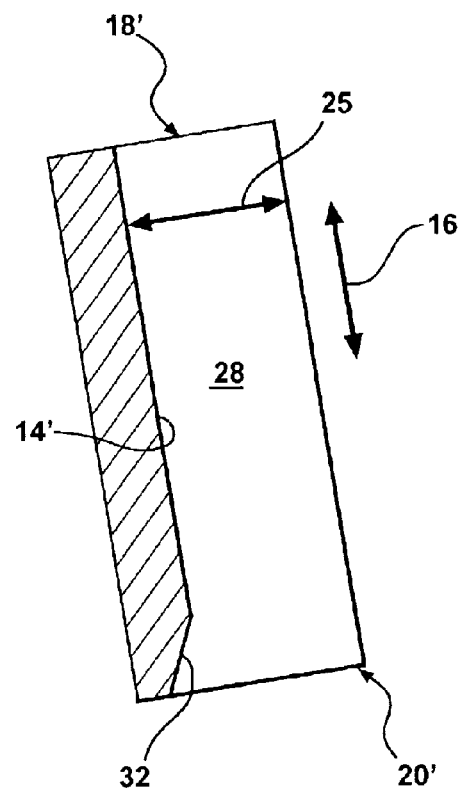
FIG. 3 is a cross sectional view taken along the line 3—3 in FIG. 2.
Figure 4:
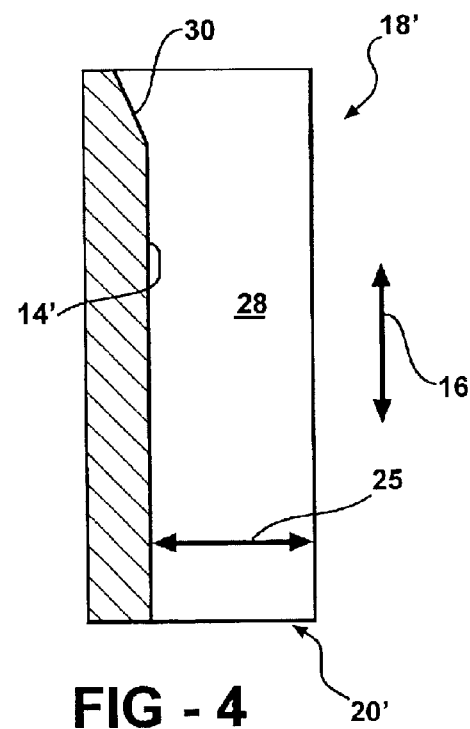
FIG. 4 is a cross sectional view taken along the line 4—4 in FIG. 2.

There is shown in FIGS. 2–4, a fragmentary view of an alternative embodiment of a stator core, indicated generally at 10'. The stator core 10' includes a plurality of core slots 12' formed in an interior surface 14' thereof. The core slots 12' define a plurality of teeth 26 between a respective interior surface 28 thereof and extend between a first end 18' and a second end 20' of the stator core 10'. A predetermined number of consecutive core slots 12' include an angled surface 30 adjacent the first end 18' of the stator core 10'. The same predetermined number of the next consecutive core slots 12' include an angled surface 32 adjacent the second end 20' of the stator core 10'. The predetermined number of consecutive core slots 12' equals the number of phases of the stator winding, discussed in more detail below. In FIGS. 2–4, the predetermined number is three because the stator core 10' is adapted to receive a three phase alternator stator winding 86 shown in FIGS. 6 and 7. The alternating pattern of angled surfaces, therefore, repeats for every three consecutive core slots 12' and repeats throughout the circumference 14 of the stator core 10'. For a six phase alternator stator winding (not shown), the predetermined number would be six and the alternating pattern would be repeated for every six consecutive slots 12' throughout the circumference 14 of the stator core 10'.

Figure 5:
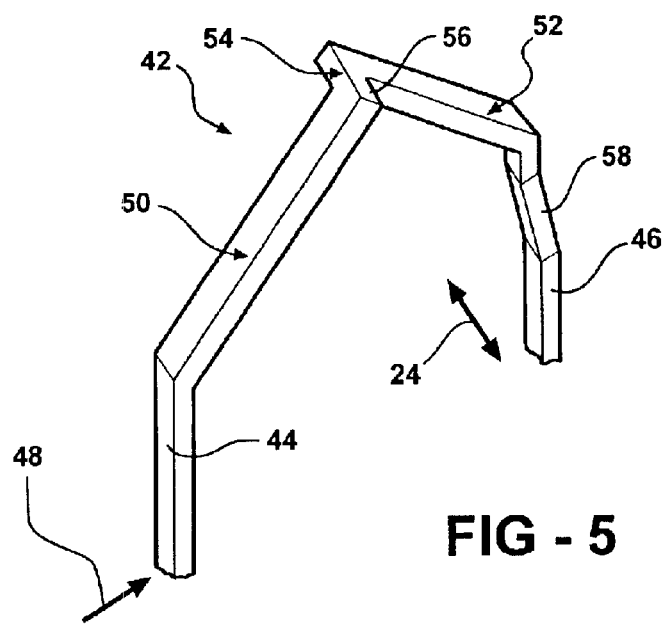
FIG. 5 is a fragmentary perspective view of an end loop segment of a stator winding in accordance with the present invention.

Referring now to FIG. 5, an end loop segment is indicated generally at 42. The end loop segment 42 is adapted to be a part of the stator winding 86 and includes a first substantially straight end portion 44 and a second substantially straight end portion 46 that are each proximate to a respective straight segment, discussed in more detail below, of the stator winding 86. The first end portion 44 and the second end portion 46 of the end loop segment 42 are at a same radial distance from the central axis 17 of the stator core 10 or 10'. The first end portion 44 and the second end portion 46 form a portion of a layer, indicated generally at 48, of the stator winding 86 whose straight segments are in a same radial distance from the central axis 17 of the stator core 10 or 10'.

The end loop segment 42 includes a first sloped portion 50 and a second sloped portion 52 that meet at an apex portion 54. The first sloped portion 50 is substantially co-radial with the layer 48, the first end portion 44 and the second end portion 46. The second sloped portion 52 is substantially non-co-radial with the layer 48, the first end portion 44 and the second end portion 46. The apex portion 54 includes a first radial extension portion 56. The first radial extension portion 56 extends from the first sloped portion 50 in the radially outward direction, which provides a radial outward adjustment for the end loop segment 42. A second sloping radial extension portion 58 connects the second sloped portion 52 and the second end portion 46. The second radial extension portion 58 extends from the second sloped portion 52 in the radially inward direction, which provides a radial inward adjustment for the end loop segment 42.

While the end loop segment 42 has been shown wherein the radial outward adjustment is adjacent the apex portion 54 and the radial inward adjustment is adjacent the second sloped portion 52, those skilled in the art can appreciate that the radial outward and inward adjustments can be on any one or on any two of the first sloped portion 50, the second sloped portion 52, and the apex portion 54 in order to provide the cascaded winding pattern, described in more detail below.

Figure 6:
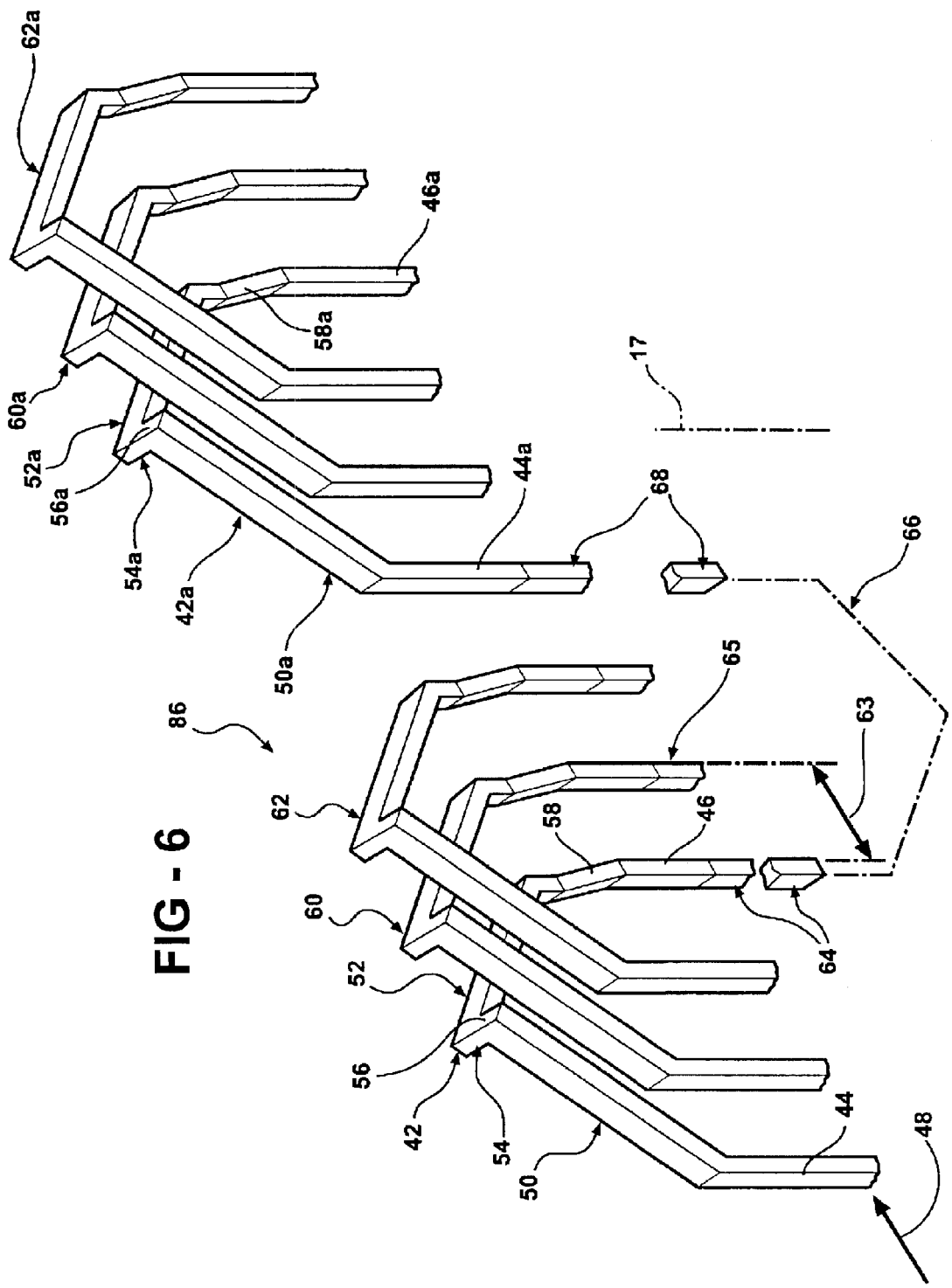
FIG. 6 is a fragmentary perspective view of a layer of end loop segments of a stator winding in accordance with the present invention including the end loop segment of FIG. 1.

Referring now to FIG. 6, the end loop segment 42 of FIG. 5 is shown adjacent a plurality of substantially identical end loop segments, indicated generally at 60 and 62. The end loop segments 42, 60, and 62 form a portion of the layer 48 of the stator winding 86. The end loop segments 42, 60, and 62 are shown in a three-phase winding pattern but those skilled in the art will appreciate that the end loop segments 42, 60, and 62 may be formed in, for example, a six-phase winding pattern, or any other winding pattern advantageous for producing electricity or for generating torque, as in the case of an electric motor. The end loop segments 42, 60, and 62 are preferably each disposed at the first end 18 or 18' of the stator core 10 or 10'.

The portion 46 attaches to a first straight segment, shown schematically at 64, which extends through a one of the core slots 12 or 12' to the second end 20 or 20' of the stator core 10 or 10'. As the first straight segment 64 exits the second end 20 or 20', the first straight segment 64 is attached to an end of another end loop segment, shown schematically at 66, which is substantially identical to the end loop segments 42, 60, and 62. The end loop segment 66 is attached at another end to a second straight segment, shown schematically at 68. The second straight segment 68 extends upwardly through another one of the core slots 12 or 12' of the stator core 10 or 10' and attaches to a portion 44a of an end loop segment 42a, which is substantially identical to the end loop segments 42, 60, and 62. Similarly, a portion 46a of the end loop segment 42a connects to another straight segment, discussed in more detail below. The pattern of connecting end loop segments 42, 66, and 42a and straight segments, such as the straight segments 64 and 68, as outlined above, continues throughout one substantial pass about the circumference 14 of the stator core 10 or 10' to form a first layer, such as the layer 48, of a single phase of the stator winding 86.

The end loop segment 42a is shown adjacent a plurality of substantially identical end loop segments, indicated generally at 60a and 62a. The end loop segments 42a, 60a, and 62a are each connected to a corresponding plurality of straight segments, discussed in more detail below, such as the straight segments 64 and 68, which are each disposed in a respective core slot 12 or 12' of the stator core 10 or 10'. The straight segments are attached to a plurality of end loop segments, discussed in more detail below, that are substantially identical to the end loop segments 60, 60a, 62, 62a, and 66. The end loop segments 60, 60a, 62, and 62a, when attached to the straight segments and end loop segments, each form a respective continuous first layer of the phase of the complete stator winding 68 that is wound about the circumference 14 of the stator core 10 or 10'.

Preferably, each of the straight segments 64 and 68 and each of the end loop segment portions 42, 42a, 60, 60a, 62, 62a, and 66 are formed from a rectangular wire and have a cross-sectional shape having a substantially equal area, however, other shapes could also be employed such as round or square. For those skilled in the art, it is known that typical rectangular or square shaped conductors may include radii on the corners intermediate two adjacent edges.

Referring now to FIGS. 7a and 7b, the first layer 48 of the end loop segments 42, 42a, 60, 60a, 62, 62a of FIG. 6, is shown with a second layer of end loop segments indicated generally at 69. The layer 69 is located radially inward of the layer 48 at a predetermined radial distance from the layer 48. The second layer 69 includes a plurality of end loop segments, indicated generally at 70, 73, and 75. The layers 48 and 69 together form a portion of the stator winding, indicated generally at 86. The conductor of the layer 69 including the end loop 70 is similar to the conductor of layer 48 including the end loop 42 except that it is inserted into the core slots, shifted by n slots, discussed in more detail below, and it has end loop segments, such as the end loop segment 70, that extend radially outwardly in the counterclockwise direction 23, which is opposite the end loop segments, such as the end loop segment 42, of the layer 48, which extend radially outwardly in the clockwise direction 21.

The end loop segment 70 includes a first sloped portion 76 and a second sloped portion 78 connected by an apex portion 80. The first sloped portion 76 is substantially co-radial with the layer 69, the first end portion 72 and the second end portion 74. The second sloped portion 78 is substantially non-co-radial with the layer 69, the first end portion 72 and the second end portion 74. The apex portion 80 includes a first radial extension portion 82. The first radial extension portion 82 extends from the first sloped portion 76 in the radially outward direction, which provides a radial outward adjustment for the end loop segment 70. A second sloping radial extension portion 84 connects the second sloped portion 78 and the second end portion 74. The second radial extension portion 84 extends from the second sloped portion 78 in the radially inward direction, which provides a radial inward adjustment for the end loop segment 70. As can best be seen in FIG. 7a, the non-co-radial portion 78 of end loop segment 70 extends radially outward where it becomes substantially co-radial with layer 48, the first end portion 44 and the second end portion 46, but because it is shifted by n slots, discussed in more detail below, it does not violate the space of the end loop segments of layer 48. This allows the end loop segments of the two layers, 48 and 69 to cascade together forming a two layer winding 86, which extends radially outward by one wire width beyond the layer 48 but does not extend radially inward beyond the innermost layer 69. For a winding with a plurality of layers, a third layer (not shown) which is substantially identical to the layer 48, would have non-co-radial portions that would extend radially outward and be substantially co-radial with the layer 69 and therefore cascade with the layer 69. For a pattern where the radial layers alternate between being substantially identical with layer 48 and then layer 69, a pattern develops where the winding only extends radially outward by one wire width for the outermost layer, 48 but not radially inward of the innermost layer. This cascading effect allows a winding 86 with a plurality of layers to be inserted into a stator core, such as the stator core 10 or 10', that extend radially outwardly by one wire width while not extending radially inwardly. The end loop segments 73 and 75 are substantially identical to the end loop segment 70. The radial outward and inward adjustments for the layers 48 and 69 form a cascaded winding pattern shown in FIGS. 7a and 7b.

Referring now to FIG. 7b, the layer 48 and the layer 69 are shown with a plurality of straight segments 88, which are substantially identical to the straight segments 64, 65, and 68. The end loop segment 66 of FIG. 6 is shown having a first sloped portion 89 and a second sloped portion 90 connected by an apex portion 91. The first sloped portion 89 is substantially co-radial with the layer 48, and the straight segments 64 and 68. The second sloped portion 90 is substantially non-co-radial with the layer 48, and the straight segments 64 and 68. The apex portion 91 includes a first radial extension portion 92. The first radial extension portion 92 extends from the first sloped portion 89 in the radially outward direction, which provides a radial outward adjustment for the end loop segment 66. A second sloping radial extension portion 93 connects the second sloped portion 90 and the straight segment 68. The second radial extension portion 93 extends from the second sloped portion 90 in the radially inward direction, which provides a radial inward adjustment for the end loop segment 66. The end loop segments 94 and 95 are substantially identical to the end loop segment 66.

Similarly, an end loop segment 96 of the layer 69 is shown adjacent the end loop segment 95 of the layer 48. The end loop segment 96 includes a first sloped portion 150 and a second sloped portion 151 connected by an apex portion 152. The first sloped portion 150 is substantially co-radial with the layer 69, and the straight segments 88 of the layer 69. The second sloped portion 151 is substantially non-co-radial with the layer 69, and the straight segments 88. The apex portion 152 includes a first radial extension portion 153. The first radial extension portion 153 extends from the first sloped portion 150 in the radially outward direction, which provides a radial outward adjustment for the end loop segment 96. A second loping radial extension portion 154 connects the second sloped portion 151 and the straight segment 88. The second radial extension portion 154 extends from the second sloped portion 151 in the radially inward direction, which provides a radial inward adjustment for the end loop segment 96. The end loop segments 97 and 98 are substantially identical to the end loop segment 96.

The straight segments 64, 65, 68, and 88 of each phase of the stator winding 68 are preferably disposed in respective core slots 12 or 12' at an equal pitch around the circumference 14 of the stator core 10 or 10'. Specifically, a straight segment of a phase, such as the straight segment 64, is disposed in a respective core slot 12 or 12' adjacent a straight segment 65 of the adjacent phase. The respective straight segments 64 and 65 are spaced apart by a circumferential distance or pitch 63, best seen in FIG. 6. The circumferential pitch 63 is substantially equal to the circumferential distance between a pair of adjacent core slots 12 or 12' in the stator core 10 or 10'. Each of the straight segments and end loop segments of the phase including the straight segment 64 remain disposed adjacent the respective straight segments and end loop segments of the phase including the straight segment 64 at the same circumferential pitch 63 throughout the length of the stator winding 68 and throughout the circumference 14 of the stator core 10 or 10'.

The radial depth 25 of the straight portion of the core slots 12 or 12' is preferably sized to receive at least two layers, such as the layers 48 and 69 of the stator winding 86, therein. The angled surfaces 30 and 32 are preferably formed in the slots 12' at the axial ends 18' and 20' of the stator core 10', such that the slots 12' are long enough to accept the straight segments of the layers 48 and 69, along with the radial adjustments 58 and 93 which mate to the angled surfaces 30 and 32.

While the straight segments 88 are shown generally coplanar in FIGS. 7a and 7b for illustrative purposes, the straight segments 88 are preferably adapted to be received by a radially curved surface, such as the interior surface 14 of the stator core 10 and, therefore, are not coplanar (i.e., the circumferential layer 48 is flattened into a plane in FIG. 2) but are are co-radial. The width of each of the straight segments 88, including any insulation, preferably fits closely to the width 13 of the core slots 12, including any insulation.

Figure 8:
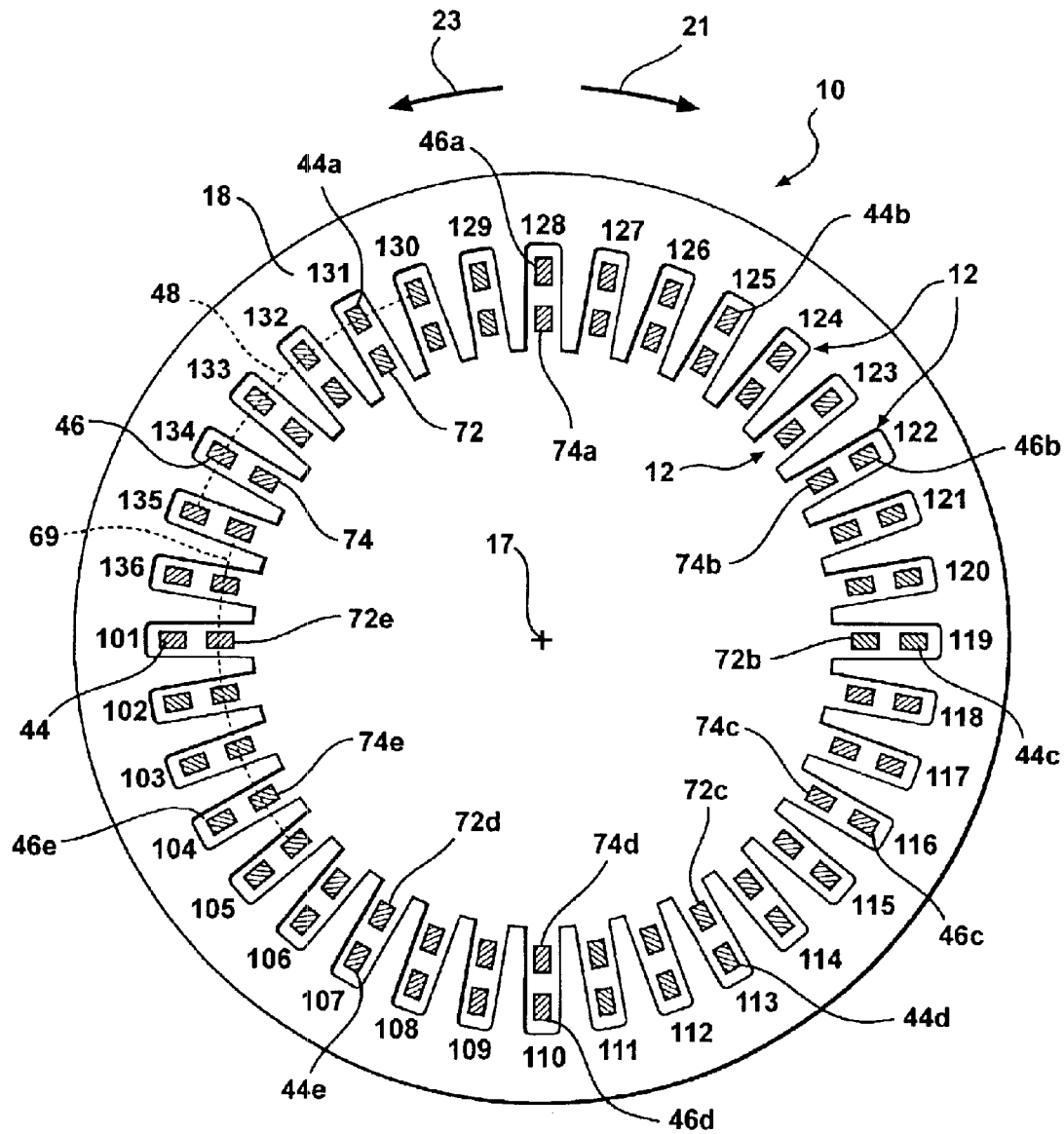
FIG. 8 is a schematic view of a stator core in accordance with the present invention and showing the locations of the various winding portions.

There is shown in FIG. 8, a plan schematic view of the stator core 10. The stator core 10 includes a total of thirty six core slots 12 numbered from 101 through 136 in increasing number in the circumferential counterclockwise direction 23. The stator winding 86 is adapted to be inserted in the core slots 12 to form a stator winding in accordance with the present invention as follows, where:

n equals the number of phases in the stator winding 86. In FIG. 8, n=3.

When the stator winding 86 is formed, a first lead that connects to the portion 44 is inserted into the second axial end 20 of the core 10 in the slot number 101 and extends from the first axial end 18 of the core 10 in the slot number 101. The portion 46 is located in the slot number 134 and the end loop segment 42 connects the portions 44 and 46 at the first axial end 18. The portion 46 connects to the straight segment 64 in the slot number 134. The straight segment 64 extends through the slot 134 and exits the second axial end 20 of the core 10 of slot number 134, where it connects to the end loop segment 66. The end loop segment 66 is substantially identical to the end loop segment 42 except that it connects the straight segment 64 exiting from slot number 134 with the straight segment 68 exiting from the slot number 131 and is located on the second axial end 20 of the core 10.

The subsequent end loop segments alternate locations on the axial ends 18 and 20 of the core 10 and connect straight portions in every nth slots. The straight portions of the end loop segments are located as follows: a straight portion 46a is located in the slot number 128, a straight portion 44b is located in the slot number 125, a straight portion 46b is located in the slot number 122, a straight portion 44c is located in the slot number 119, a straight portion 46c is located in the slot number 116, a straight portion 44d is located in the slot number 113, a straight portion 46d is located in the slot number 110, a straight portion 44e is located in the slot number 107, and a straight portion 46e is located in the slot number 104. Each of the straight portions 44–44e and 46–46e, together with the associated end loop segments, form a continuous conductor of one phase of the stator winding 86. The straight portion 46e extends from the second end 20 of the stator core 10 as a second lead (not shown) and completes the layer 48 of the continuous phase. The first lead of the layer 48, therefore, extends from the slot number 101 and the second lead of the phase extends from the slot number 104. Each of the first and second leads is located on the second axial end 20 of the stator core 10.

The layer 69 of the phase lays radially inward of the layer 48 and is shifted by n slots, such that the respective end loop segments are on the opposite axial end 18 or 20 of the core 10 as the respective end loop segments of the first layer 48.

A first lead that connects to the portion 74 is inserted into the second axial end 20 of the core 10 in the slot number 134 and extends from the first axial end 18 of the core 10 in the slot number 134. The portion 72 is located in the slot number 131 and the end loop segment 70 connects the portions 72 and 74 at the first axial end 18. The portion 72 connects to a straight segment, such as the straight segment 88, in the slot number 131. The straight segment 88 extends through the slot number 131 and exits the second axial end 20 of the core 10 of the slot number 131, where it connects to an end loop segment, such as the end loop segment 96 of FIG. 7b, that is substantially identical to the end loop segment 70 except that it connects the straight segments exiting from slot number 131 with another straight segment 88 exiting from the slot number 128 and is located on the second axial end 20 of the core 10.

Similar to the layer 48, the subsequent end loop segments alternate locations on the axial ends 18 and 20 of the core 10 and connect straight portions in every nth slots. The straight portions of the end loop segments are located as follows: a straight portion 74a is located in the slot number 128, a straight portion 72a is located in the slot number 125, a straight portion 74b is located in the slot number 122, a straight portion 72b is located in the slot number 119, a straight portion 74c is located in the slot number 116, a straight portion 72c is located in the slot number 113, a straight portion 74d is located in the slot number 110, a straight portion 72d is located in the slot number 107, a straight portion 74e is located in the slot number 104, a straight portion 72e is located in the slot number 101. Each of the straight portions 72–72e and 74–74e, together with the associated end loop segments, form a continuous phase of the stator winding 86. The straight portion 72e extends from the second end 20 of the stator core 10 as a second lead (not shown) and completes the layer 69 of the continuous phase. The first lead of the layer 69, therefore, extends from the slot number 134 and the second lead of the phase extends from the slot number 101. Each of the first and second leads is located on the second axial end 20 of the stator core 10. Preferably, the first and second leads of each layer 48 and 69 are connected to a rectifier (not shown), for supplying DC power to an automotive battery (not shown).

Each of the respective end loop segments 42, 60, 62, 66, 70, 73, 75, 94, 95, 96, 97, and 98 of the conductors of the stator winding 42 are cascaded, meaning that for each pass around the stator core 10, each of the conductors can be inserted into the stator core 10 in a sequential order. For example, the conductor including the end loop segment 42 is inserted for one substantial revolution about the circumference 14 of the stator core 10. After the conductor including the end loop segment 42 is inserted, the conductor including the end loop segment 60 may be inserted for one substantial revolution about the circumference 14 of the stator core 10. This pattern is repeated for the conductor including the end loop segment 62. As seen in FIG. 7b, when the conductor are inserted in this manner, the entirety of each of the continuous conductors may be wound about the circumference 14 of the stator core 10 without interfering with any of the other conductors. Preferably, the conductors of the layers 48 and 69 are aligned in one radial row in each slot 12 or 12'.

The conductor including end loop segment 42 of layer 48, and the conductor including end loop segment 70 of layer 69, include straight segments which coexist in the same core slots, as can best be seen in FIG. 7a. Therefore, these two conductors are the conductors of one phase. Furthermore, because each conductor passes circumferentially once around the core, the phase of a winding with two layers 48 and 69, is comprised of two conductors, each passing once circumferentially around the core 10. Similarly, the two conductors including end loop segments 60 and 73 coexist as a second phase and the conductors including end loop segments 62 and 75 coexist as a third phase, best seen in FIG. 7a.

Alternatively, the layers 48 and 69 of one particular phase are formed from one single continuous conductor. The phase winds around the core 10, alternating end loop segments with straight segments in predetermined core slots 12, in one circumferential direction as the radially outer layer 48 of the winding 86 and then reverses direction and winds around the core in the opposite circumferential direction as the radially inner layer 69 of the winding 68. When the first straight portion 46e extends from the axial end 20 of the stator core, instead of extending from the stator core 10 as a second lead, it extends radially inwardly and connects to an end loop segment, which enters the slot number 101 in the radially inward layer 69 to connect to the straight portion 72e. This wind pattern creates a reversing end loop portion 155, best seen in FIG. 9.

Figure 9:
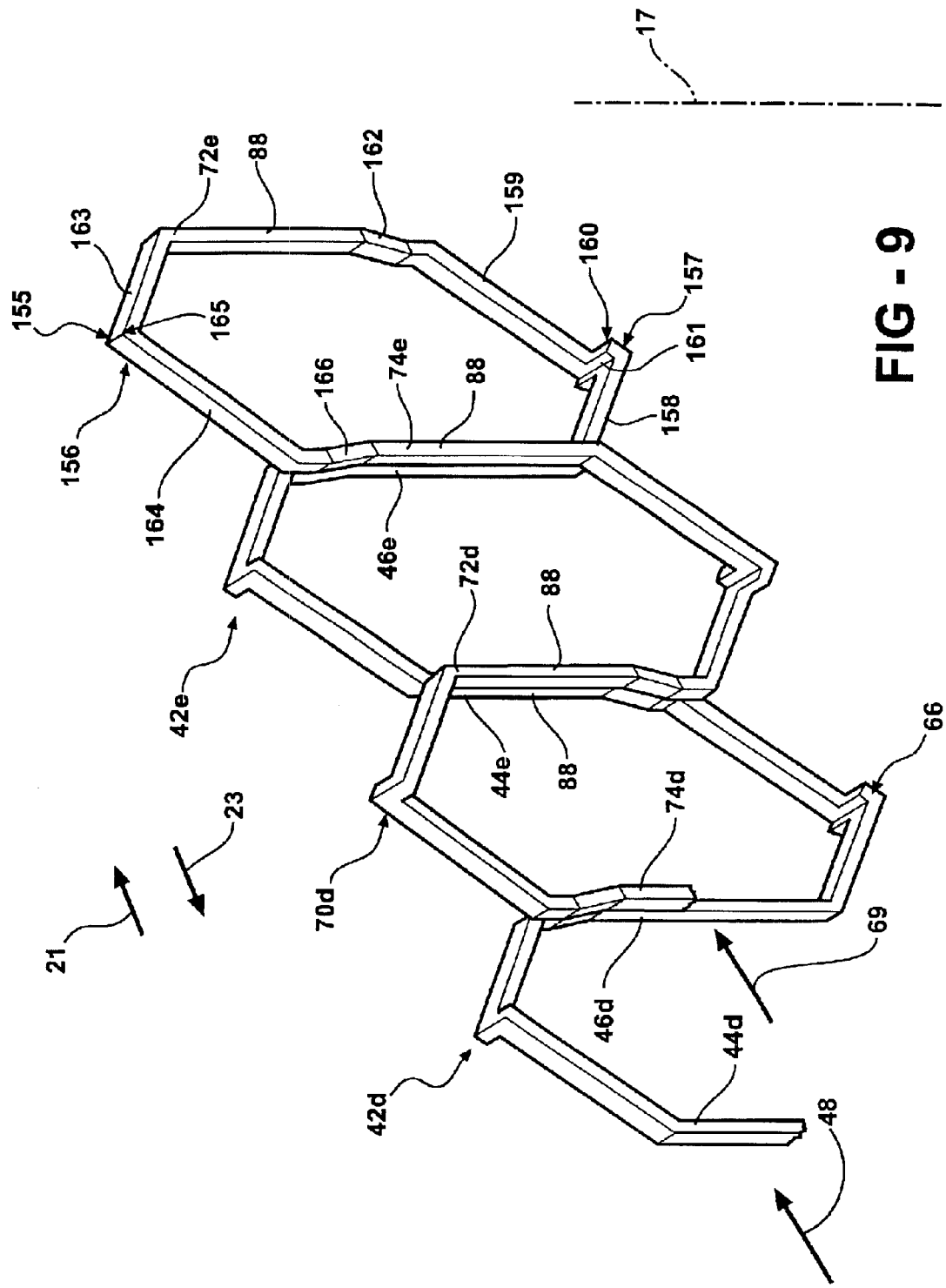
FIG. 9 is a perspective view of a reversing end loop portion of a stator winding in accordance with the present invention.

Referring now to FIG. 9, the reversing end loop portion 155 is shown connecting the layer 48 and the layer 69 of one of the phases from FIGS. 7a and 7b and is shown adjacent an end loop segment 42d, which connects straight portions 44d and 46d, an end loop segment 42e, which connects straight portion 44e and 46e and an end loop segment 70d, which connects straight portions 72d and 74d. The reversing end loop portion 155 includes an upper reversing end loop segment 156 and a lower end loop segment 157 that are connected by respective straight portions 88. The lower end loop segment 157 includes a first sloped portion 158 and a second sloped portion 159 connected by an apex portion 160. The first sloped portion 158 is substantially co-radial with the layer 48. The second sloped portion 159 is substantially non-co-radial with the layer 48. The apex portion 160 includes a first radial extension portion 161. The first radial extension portion 161 extends from the first sloped portion 158 in the radially outward direction, which provides a radial outward adjustment for the lower end loop segment 157. A second sloping radial extension portion 162 connects the second sloped portion 159 and the straight segment 88. The second radial extension portion 162 extends from the second sloped portion 159 in the radially inward direction, which provides a radial inward adjustment for the lower end loop segment 157. The lower end loop segment 157, therefore, is substantially identical to the end loop segment 66.

The upper reversing end loop segment 156 includes a first sloped portion 163 and a second sloped portion 164 connected by an apex portion 165. The first sloped portion 163 and the second sloped portion 164 are substantially co-radial with the layer 48. The apex portion 165 is a straight connection between the first sloped portion 163 and the second sloped portion 164 and does not include a radial adjustment. A radial extension portion 166 connects the second sloped side 164 to the straight portion 74e.

In the stator core 10 of FIG. 1, the radial adjustments, such as the radial extension portions 58, 84, 162, and 166 are located exterior of the stator core slots 12 and adjacent a respective upper and lower surface of the first axial end 18 and the second axial end 20 of the stator core 10. Alternatively, the stator winding 68 is installed in the stator core 10' and the radial extension portions 58, 84, 162, and 166, are located in the interior of the stator core 10' in the core slots 12' adjacent the angled surface 30 of the first axial end 18' and the angled 32 of the second axial end 20' of the stator core 10'.

The end loop segments 42, 60, and 62 of the phases are substantially identical, which advantageously allows each of the phases to be processed from the same tooling. Similarly, the end loop segments 70, 73, and 75 are substantially identical, which advantageously allows each of the phases to be processed from the same tooling.

While the stator winding 86 has been shown and described as a three phase stator winding, those skilled in the art, however, will appreciate that the stator winding 86 could be formed as a six phase winding or any other pattern advantageous for producing electrical power or for generating torque, as in the case of an electric motor.

Although the stator winding 86 has been shown as having two layers 48 and 69 and therefore two conductors in each slot, it is often desirable to have a stator winding with more layers, such as four, and more conductors in each slot. This can be achieved by installing a plurality of layers substantially identical to layer 48 and layer 69 and radially alternating the windings substantially identical to layer 48 with windings substantially identical with layer 69, resulting in a plurality of layers and a plurality of conductors in each slot.

Figure 10:
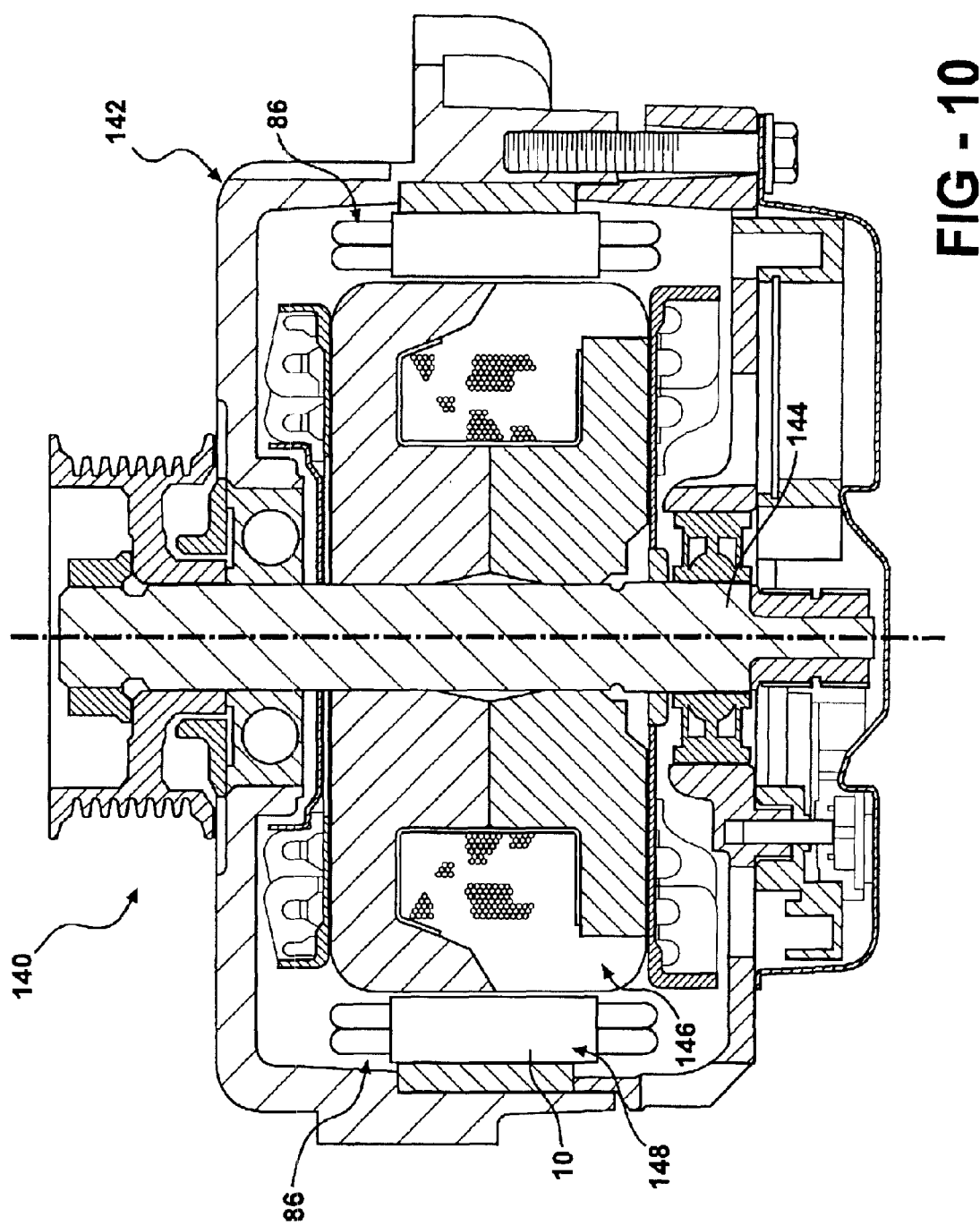
FIG. 10 is a cross-sectional view of an alternator in accordance with the present invention.

Referring now to FIG. 10, a dynamoelectric machine in accordance with the present invention is indicated generally at 140. The dynamoelectric machine is preferably an alternator, but those skilled in the art will appreciate that the dynamoelectric machine can be, but is not limited to, an electric motor, an integrated starter-motor, or the like. The dynamoelectric machine 140 includes a housing 142 having a shaft 144 rotatably supported by the housing 142. A rotor assembly 146 is supported by and adapted to rotate with the shaft 144. The rotor assembly can be, but is not limited to, a "claw pole" rotor, a permanent magnet non claw pole rotor, a permanent magnet claw pole rotor, a salient field wound rotor or an induction type rotor. A stator assembly 148 is fixedly disposed in the housing 142 adjacent the rotor assembly 146. The stator assembly 148 includes a stator core, such as the stator core 10 and a winding, such as the stator winding 86.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A stator for a dynamoelectric machine, comprising:
   a generally cylindrically-shaped stator core having a plurality of circumferentially spaced and axially-extending core slots in a surface thereof, said core slots extending between a first and a second end of said stator core; and
   a stator winding including at least one layer of continuous conductors having a plurality of phases, each of said phases having a plurality of substantially straight segments disposed in said core slots, said straight segments alternately connected at said first and second ends of said stator core by a plurality of end loop segments, each of said straight segments of said at least one layer being in a same radial distance from a central axis of said stator core, said straight segments and said end lop segments having a substantially equal cross sectional area,
   wherein said end loop segments form a cascaded winding pattern.

2. The stator according to claim 1 wherein at least one of said end loop segments includes a first sloped portion substantially co-radial with said at least one layer and a second sloped portion substantially non-co-radial with said at least one layer, said first and second sloped portions connected by an apex portion thereof.

3. The stator according to claim 1 wherein at least one of said end loop segments includes a radial adjustment portion to form said cascaded winding pattern.

4. The stator according to claim 1 including at least two layers and wherein at least one of said layers is shifted a predetermined number of slots from at least one of another said layers.

5. The stator according to claim 4 wherein said end loop segments of a one of said layers extend radially outwardly in a counterclockwise direction on said first axial end of said stator core and said end loop segments of another one of said layers extend radially outwardly in a clockwise direction on said first axial end of said stator core.

6. A stator for a dynamoelectric machine, comprising:
   a generally cylindrically-shaped stator core having a plurality of circumferentially spaced and axially-extending core slots in a surface thereof, said core slots extending between a first and a second end of said stator core; and
   a stator winding including at least one layer of continuous conductors having a plurality of phases, each of said phases having a plurality of substantially straight segments disposed in said core slots, said straight segments alternately connected at said first and second ends of said stator core by a plurality of end loop segments, each of said straight segments of said at least one layer being in a same radial distance from a central axis of said stator core,
   wherein each of said end loop segments includes a first sloped portion substantially co-radial with said at least one layer and a second sloped portion substantially non-co-radial with said at least one layer, said first and second sloped portions connected by an apex portion thereof, and
   wherein a one of said first sloped portion, said second sloped portion, and said apex portion of each of said end loop segments includes a radial outward adjustment and a one of said first sloped portion, said second sloped portion, and said apex portion of each of said end loop segments includes a radial inward adjustment to form a cascaded winding pattern.

7. The stator according to claim 6 wherein said outward radial adjustment is a first radial extension at said apex portion and said radial inward adjustment is a second sloping radial extension adjacent a one of said straight segments.

8. The stator according to claim 6 wherein said stator core slots have a substantially rectangular volume.

9. The stator according to claim 6 wherein each of said straight segments has a first substantially rectangular cross-sectional shape and said end loop segments have a second substantially rectangular cross-sectional shape.

10. The stator according to claim 9 wherein an area of said first cross-sectional shape is equal to an area of said second cross-sectional shape.

11. The stator according to claim 6 wherein said straight segments of adjacent phases are disposed in said core slots at an equal pitch around the circumference of said stator core.

12. The stator according to claim 6 wherein the width of said straight segments, including any insulation, fit closely to the width of said core slots, including any insulation.

13. The stator according to claim 6 wherein said stator winding includes at least two layers of conductors.

14. The stator according to claim 13 wherein each of said phases of said at least two layers are formed from a single continuous conductor.

15. The stator according to claim 14 wherein said at least two layers are connected by a reversing end loop.

16. The stator according to claim 13 wherein the conductors of said at least two layers are aligned in one radial row in each slot.

17. The stator according to claim 13 wherein a portion of said end loop segments of said conductors of said at least two layers, lay radially outward by one wire width for the outermost layer.

18. The stator according to claim 6 wherein an interior surface of said stator core slots is substantially parallel to said central axis of said stator core.

19. The stator according to claim 18 wherein a one of said radial outward adjustment and said radial inward adjustment is adjacent a one of said first and second end of said stator core.

20. The stator according to claim 18 wherein a radially angled surface is formed in said interior surface of a predetermined number of said core slots.

21. The stator according to claim 20 wherein said radially angled surfaces are adjacent said first end on a number of consecutive core slots equal to the number of said plurality of phases and said radially angled surfaces of circumferentially adjacent core slots are adjacent said second axial end.

22. The stator according to claim 21 wherein a one of said radial outward adjustment and said radial inward adjustment is mated to said angled surface in said core slots.

23. A dynamoelectric machine, comprising:

a housing;

a shaft rotatably supported by said housing;

a rotor supported by and adapted to rotate with said shaft; and a stator fixedly disposed in said housing adjacent said rotor, said stator comprising:

a generally cylindrically-shaped stator core having a plurality of circumferentially spaced axially-extending core slots in a surface thereof, said core slots extending between a first and a second end of said stator core; and a stator winding including at least one layer of continuous conductors having a plurality of phases, each of said phases having a plurality of substantially straight segments disposed in said core slots, said straight segments alternately connected at said first and second ends of said stator core by a plurality of end loop segments, each of said straight segments of said at least one layer being in a same radial distance from a central axis of said stator core, wherein each of said end loop segments includes a first sloped portion substantially co-radial with said at least one layer and a second sloped portion substantially non-co-radial with said at least one layer, said first and second sloped portions connected by an apex portion thereof, and wherein a one of said first sloped portion, said second sloped portion, and said apex portion of each of said end loop segments includes a radial outward adjustment and another one of said first sloped portion, said second sloped portion, and said apex portion of each of said end loop segments includes a radial inward adjustment to form a cascaded winding pattern.

* * * * *